United States Patent Office 3,555,875
Patented Jan. 19, 1971

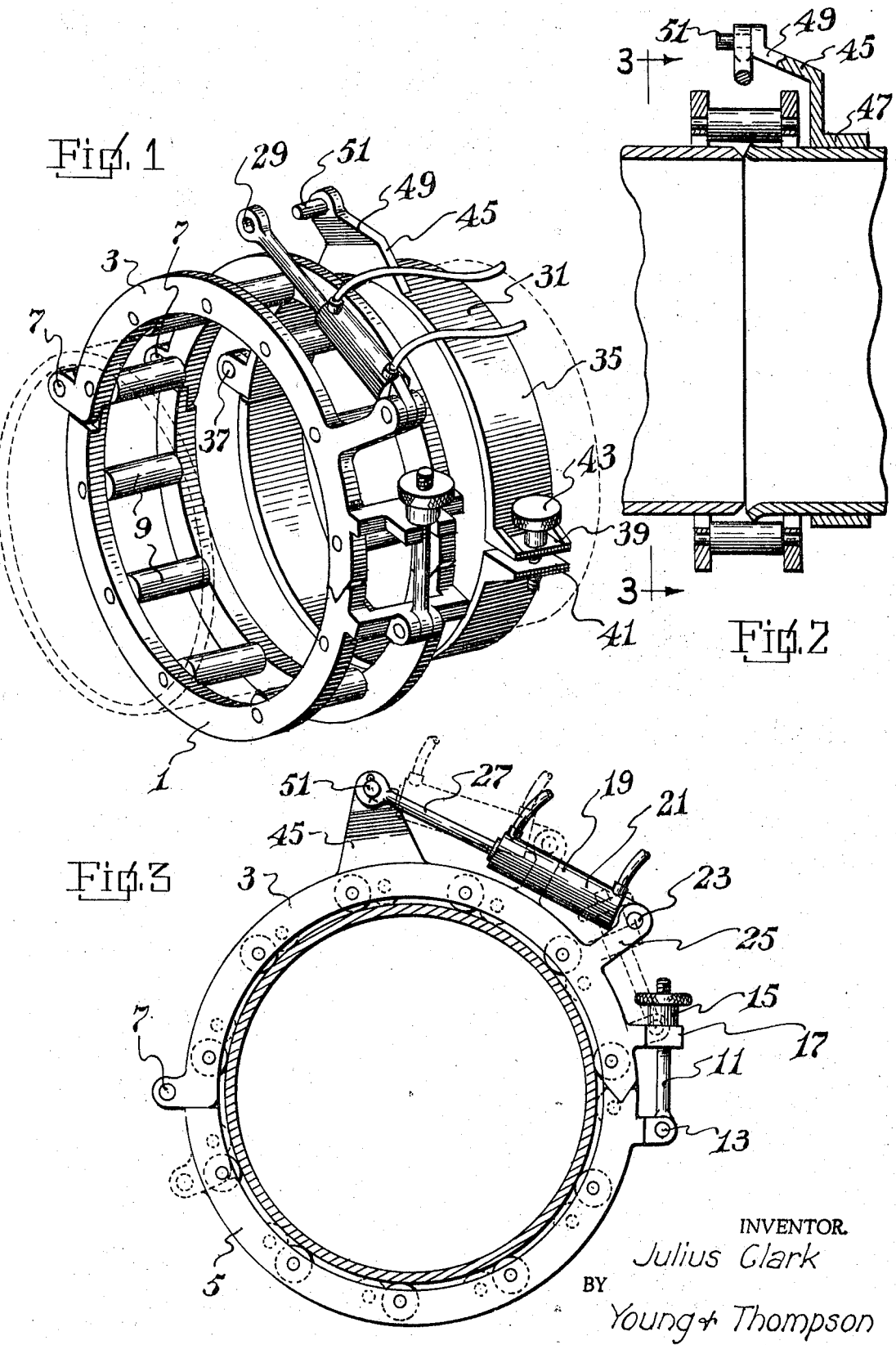

3,555,875
PIPE END SWAGING DEVICE
Julius Clark, 313 W. Boston,
Broken Arrow, Okla. 74012
Filed May 13, 1968, Ser. No. 728,565
Int. Cl. B21d 31/00
U.S. Cl. 72—292                              6 Claims

ABSTRACT OF THE DISCLOSURE

For swaging pipe ends preparatory to forming a pipe joint, a collar with swaging rollers is placed over the pipe end and a clamping band is fixedly secured to an adjacent portion of the pipe. A fluid motor acts between the collar and the clamping band to roll the collar about the pipe end with a stroke greater than the distance between swaging rollers. The collar can be progressively tightened down on the pipe end.

---

The present invention relates to apparatus for swaging pipe ends, more particularly for giving a circular configuration to the ends of large pipes such as pipeline sections preparatory to forming a joint between two endwise abutting sections.

The ends of large pipe sections are almost never suitably circular in the as-manufactured condition. They may be out-of-round or belled or both. In this condition, they cannot be satisfactorily welded to adjacent pipe sections for forming a pipeline. Therefore, in the past, it has been a common practice to try to true the ends by beating them with sledge hammers; but the resulting end is almost never truly circular and the subsequent weld will be imperfect.

Accordingly, it is an object of the present invention to provide apparatus for swaging pipe ends, in which the pipe end after swaging will be truly circular and in line with the rest of the pipe section.

Another object of the present invention is the provision of apparatus for swaging pipe ends, which will be relatively simple adn inexpensive to manufacture, easy to assemble, operate, maintain and repair, and rugged and durable in use.

Other objects and advantages of the present invention will become apparent from a consideration of the following description, taken in connection with the accompanying drawing, in which:

FIG. 1 is a perspective view of apparatus according to the present invention;

FIG. 2 is a cross-sectional view of apparatus according to the present invention, in position about a pipe joint to be formed; and FIG. 3 is a cross-sectional view taken on the line 3—3 of FIG. 2.

Referring now to the drawing in greater detail, there is shown apparatus according to the present invention, for swaging pipe ends, comprising a circular swaging collar 1 in the form of two separable semicircular halves 3 and 5 interconnected by hinge pins 7 for pivotal movement about an axis parallel to the axis of the closed collar 1.

Mounted on collar 1 for rotation about parallel axes that lie on a common cylinder are a plurality of cylindrical swaging rollers 9. Rollers 9 are of the same diameter and are spaced apart equal peripheral distances about collar 1.

Means are provided for releasably clamping halves 3 and 5 together in the closed position of collar 1, in the form of a screw shank 11 pivotally connected by a pin 13 to collar half 5 for swinging movement about an axis parallel to the axes of rollers 9. Shank 11 is screw threaded at its free end where it carries a manually rotatable adjustment nut 15 that engages with a slotted bracket 17 on roller half 3 progressively to draw roller halves 3 and 5 together to the position best shown in FIG. 3. As is also shown in FIG. 3, the free ends of collar halves 3 and 5 have mating V-shaped cam surfaces whereby misalignment of the collar halves is avoided even in their most tightly closed position.

It will thus be seen that when collar halves 3 and 5 are closed, the collar 1 can be rotated with more or less difficulty about its axis. In order thus to rotate collar 1, a fluid motor 19 is provided, whose cylinder 21 is mounted for swinging movement about a pin 23 on a bracket 25 fixed to collar half 3. The piston of fluid motor 19 has a piston rod 27 having an eye 29 at its free end. Conduits are provided for directing fluid under pressure from a source of fluid pressure (not shown) through selector valve means (not shown) to either end of cylinder 21 to reverse the action of motor 19.

In order to provide a fixed abutment against which fluid motor 19 can act, a clamping band 31 is provided having two halves 33 and 35 that are interconnected by and swing about a hinge pin 37. At their free ends, clamping band halves 33 and 35 are provided with flanges 39 and 41, respectively, which are traversed by a tightening screw 43.

Fixedly secured to clamping band half 35 is a bracket 45 that has a radially outwardly extending base portion 47 and a laterally extending end portion 49. At the free end of portion 49 is a piston rod pivot pin 51 which extends parallel to the axis of the apparatus and is adapted rotatably to slide within piston rod eye 29.

The operation of swaging or truing a pair of adjacent pipe ends preparatory to the formation of a welded joint proceeds as follows:

The collar halves 3 and 5 are swung open and are fitted about the abutting pipe ends and are then closed to the position shown in FIG. 2. The shank 11 is swung into slotted bracket 17, and nut 15 is tightened until the rollers 9 firmly grip at least one of the pipe ends between them. With piston rod 27 either fully extended or fully retracted, the clamping band halves 33 and 35 are opened and the clamping band 31 is fitted over one of the pipes next to collar 1. Tightening screw 43 is tightened to the extent necessary to hold the halves 33 and 35 loosely closed but not to the extent to prevent sliding of clamping band 31 on the pipe it encircles. Clamping band 31 is then rotated until its pivot pin 51 is aligned with piston rod eye 29, and clamping band 31 is then slid lengthwise of the pipes until pivot pin 51 enters and fully seats within piston rod eye 29. Tightening screw 43 is then fully tightened until band 31 is quite fixedly and firmly secured to the pipe it encircles.

Thereafter, the application of fluid pressure to fluid motor 19 in a sense to move cylinder 21 relative to piston rod 27 will rotate swaging collar 1 about the pipe joint a peripheral distance about equal to the stroke of the piston, during which rollers 9 will perform a swaging action on at least one of the subjacent pipe ends. The stroke of fluid motor 19 is accordingly somewhat greater than the peripheral distance between rollers 9, so that the paths of the rollers will overlap and there will remain no unswaged portion of the periphery of the pipe ends.

The supply of pressure fluid to motor 19 is then reversed, whereupon collar 1 is moved back to its original position; and of course this oscillating movement is repeated several times until collar 1 rotates relatively easily. Nut 15 is then tightened and the next stage of swaging is performed, and so on until rollers 9 rest flat against the outer cylindrical surfaces of the pipe ends, which are now aligned and concentric with each other. Finally, the assembly technique can be performed in reverse to disassemble the apparatus and remove it from the vicinity of the pipe ends to permit the welding operation to be performed.

If desired, in order to avoid any possible margin of error, the apparatus can be loosened after the swaging operation and rotated 90° and then reapplied for a final truing operation; but under ordinary conditions, this additional step will not be needed.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for swaging pipe ends, comprising a collar adapted to encircle a pipe end, a plurality of rollers carried by and spaced peripherally about the collar, means for progressively tightening the collar on a pipe end encircled by the collar so as to move the rollers progressively radially inwardly thereby progressively to swage the end of a pipe encircled by the collar by contact between the rollers and said encircled pipe end, a clamping band coaxial with but disposed in side-by-side relationship relative to said collar for releasably but fixedly grasping said pipe end at a location laterally spaced from the portion of the pipe end swaged by the rollers, and power means acting between the collar and the clamping band to rotate the collar relative to the band.

2. Apparatus as claimed in claim 1, said progressive tightening means comprising screw means for progressively tightening together relatively movable portions of said collar.

3. Apparatus as claimed in claim 2, said collar being in the form of two separable halves pivotally interconnected about an axis parallel to the axis of the collar, said screw means comprising a screw carried by one of said halves and a nut acting against the other said half to urge said two halves toward each other.

4. Apparatus as claimed in claim 1, said power means comprising a reversible fluid motor having a cylinder and a piston one of which is connected to the clamping band and the other of which is connected to the collar.

5. Apparatus as claimed in claim 4, and means pivotally interconnecting said fluid motor both to the collar and to the clamping band.

6. Apparatus as claimed in claim 5, said pivotal interconnecting means comprising a pin and eye connection between the fluid motor and one of the collar and clamping band for connecting and disconnecting the fluid motor from said one of the collar and clamping band upon axial movement of the collar and clamping band relative to each other.

References Cited

UNITED STATES PATENTS

| Re. 16,220 | 12/1925 | Mirfield | 72—110 |
| 1,065,629 | 6/1913 | Simpson | 72—318 |
| 2,798,390 | 7/1957 | Bennett | 72—126 |
| 2,800,867 | 7/1957 | Smith | 72—292 |
| 1,596,751 | 8/1926 | Millspaugh | 79—126 |
| 680,228 | 8/1901 | Finlayson | 79—200 |

CHARLES W. LANHAM, Primary Examiner

M. J. KEENAN, Assistant Examiner

U.S. Cl. X.R.

72—316